United States Patent [19]

Kelley et al.

[11] Patent Number: 5,280,295
[45] Date of Patent: * Jan. 18, 1994

[54] NAVIGATION AND POSITIONING SYSTEM AND METHOD USING UNCOORDINATED BEACON SIGNALS

[75] Inventors: David C. Kelley, Plano; David T. Rackley, Garland; Victor P. Berglund, Fairview, all of Tex.

[73] Assignee: Terrapin Corporation, Garden Grove, Calif.

[*] Notice: The portion of the term of this patent subsequent to Dec. 22, 2009 has been disclaimed.

[21] Appl. No.: 994,670

[22] Filed: Dec. 22, 1992

Related U.S. Application Data

[63] Continuation of Ser. No. 745,154, Aug. 15, 1991, Pat. No. 5,173,710.

[51] Int. Cl.[5] ................................................ G01S 3/02
[52] U.S. Cl. .................................. 342/463; 342/457; 342/394; 342/442
[58] Field of Search ................ 342/463, 457, 394, 442

[56] References Cited

U.S. PATENT DOCUMENTS

| | | | |
|---|---|---|---|
| 3,715,758 | 2/1973 | Sender | 342/463 |
| 3,757,340 | 9/1973 | Rogoff . | |
| 3,886,554 | 5/1975 | Braun et al. . | |
| 3,889,264 | 6/1975 | Fletcher . | |
| 4,054,880 | 10/1977 | Dalabakis et al. . | |
| 4,169,245 | 9/1979 | Crom et al. . | |
| 4,555,707 | 11/1985 | Connelly | 342/387 |
| 4,651,156 | 3/1987 | Martinez . | |
| 4,665,404 | 5/1987 | Christy et al. . | |
| 4,701,760 | 10/1987 | Raoux . | |
| 4,799,062 | 1/1989 | Sanderford et al. . | |
| 4,916,455 | 4/1990 | Bent et al. | 342/457 |
| 5,045,861 | 9/1991 | Duffett-Smith | 342/547 |

Primary Examiner—Theodore M. Blum
Attorney, Agent, or Firm—Flehr, Hohbach, Test, Albritton & Herbert

[57] ABSTRACT

A positioning system uses a multiplicity of commercial broadcast stereo FM radio signal transmitters, at known fixed locations, each of which transmits a beacon signal having a phase that is un-synchronized with the phases of the beacon signals of the other transmitters. All the beacon signals have a frequency approximately equal to a 19 KHz. A fixed position observer unit, positioned at a known location, receives the beacon signals from all the transmitters in the vicinity, determines their relative phases, and broadcasts data representing these relative phases. Mobile units, at unknown locations, receive these broadcast values, as well as beacon signals from at least three radio transmitters. Each mobile unit includes phase detection circuitry that detects the phases of the beacon signals at the mobile receiver's current position. This is accomplished using a single radio signal receiver. A digital phase-locked loop, coupled to the radio signal receiver, generates a phase error signal for each beacon signal. The phase error signals are then used to compute a distinct phase value for each beacon signal. In the preferred embodiment, each mobile receiver includes a computer for computing its location based on the broadcast relative phase values and the detected phases. In another embodiment the position computations for many mobile receivers are performed at a central data processing station.

10 Claims, 8 Drawing Sheets

NAVIGATION AND POSITIONING SYSTEM AND METHOD USING UNCOORDINATED BEACON SIGNALS

This application is a continuation of patent application Ser. No. 07/745,154, filed Aug. 15, 1991, and issued on Dec. 22, 1992 as U.S. Pat. No. 5,173,710.

The present invention relates generally to navigation and positioning systems in which an object or user at an unknown location receives broadcast signals from several sources and uses information derived therefrom to determine the object's or user's current position. More particularly, the present invention relates to a positioning system which uses uncoordinated beacon signals from commercial radio broadcasts to enable a highly accurate position determination.

BACKGROUND OF THE INVENTION

Most of the well known prior art navigation and positioning system, such as LORAN, NAVSTAR, and GPS use special transmitters, either orbiting the earth or land-based, dedicated solely to the positioning system. Great efforts are made in such systems to synchronize the transmitters in these systems so that the phases of the beacon signals reaching a user at any location on the earth's surface can be calculated with a known level of accuracy. These types of prior art systems generally require huge capital investments, often government subsidized, because the transmitters and their control systems are very complex and expensive.

In the present invention, the signals used for positioning are the 19 KHz pilot signals transmitted by commercial broadcast stereo FM stations. In the United States, there are nearly 5000 commercial broadcast stereo FM radio stations, and the FCC requires that all commercial stereo FM radio stations broadcast a 19 KHz pilot sub-carrier signal. The maximum allowed deviation is ±2 hertz. Generally the rate of frequency drift has been found to be much less than 0.1 hertz per day. In any case, the transmitters used by the present invention are free, which makes the positioning system of the present invention relatively inexpensive to implement.

Two U.S. patents which describe "delta-position" systems using commercial broadcast transmissions are U.S. Pat. Nos. 4,054,880 (Dalabakis et al.) and 3,889,264 (Fletcher). These prior art patents describe systems using three spaced-apart radio signals, each of which is an independent AM radio signal. The systems typically have a vehicle carried mobile receiver, with a separate tuner for each station, and a second receiver at a fixed, known position. Basically, these systems count "zero crossings", each of which indicates that the user has moved a certain distance from his previous location. Thus, if the user needs to know his current position, the user needs to first specify his starting position. A fixed position receiver detects frequency drift of the transmitters, and that drift information is used to adjust and coordinate the zero crossing counts made by the mobile receivers.

These are "delta-position" systems because they determine only the distance and direction travelled by a mobile user from any particular starting point. Neither Dalabakis nor Fletcher actually determines the position of the mobile user, and in fact such a determination is not possible using the Dalabakis or Fletcher systems because these systems do not have the ability to determine the phases of the transmitted radio signals. Furthermore, since only zero crossings are counted, the positioning accomplished by these systems have "granularity", which in the case of the systems disclosed in these two patents is on the order of thirty meters.

Like Dalabakis and Fletcher, the present invention uses spaced apart, commercial radio signals. The present invention also uses a fixed position receiver to help the mobile units determine their position. However, the present invention, unlike Dalabakis and Fletcher, determines the user's position without need for any starting point information, and determines such positions with a high degree of accuracy. To do this, the fixed position receiver not only determines frequency drift, it also determines the relative phases of the various beacons with a very high degree of accuracy (e.g., within about 0.02 degrees, or equivalently, within about 0.00035 radians) using a digital phase-locked loop. Using this relative phase information, the commercial radio signal beacons are transformed, in essence, into coordinated beacon signals with well defined phase relationships. As a result, the position of the mobile users can be computed from the radio signals received by the mobile user, with an accuracy of about ±3 feet in any direction.

Two other important differences between the present invention and Dalabakis and Fletcher are (1) the use of 19 KHz beacon sub-carrier signals of commercial broadcast stereo FM stations, and (2) the use of a single receiver for observing the phases of multiple radio signals. FM radio signals are inherently better than the AM radio signals, because FM modulated signals all less susceptible to noise. Further, the hard limiter found at the front of most FM receivers rejects weaker signals, thus providing multipath rejection.

Also important is the use of a single receiver which scans through all the available FM radio station frequencies. This is not simply an economy measure. The key here is that precisely measuring the relative phases of several signals requires that the measurement system not introduce errors into the system—such as the errors that would be caused by having different propagation delays for separate, multiple receiving circuits. A small phase error can produce a relatively large positioning error. By using the same physical circuitry for all signals, the same phase delay through the circuitry occurs for all received signals.

SUMMARY OF THE INVENTION

In summary, the present invention is a positioning system, which uses a multiplicity of commercial radio signal transmitters, at known fixed locations, each of which transmits a beacon signal having a phase that is unsynchronized with the phases of the beacon signals of the other transmitters. All of the beacon signals have a frequency which is approximately equal to a predetermined target frequency. In the preferred embodiment, the beacon signals are 19 KHz pilot tones generated by commercial broadcast stereo FM stations.

A first receiver, known as the fixed position observer, is positioned at a known location. The fixed observer receives the beacon signals, determines the relative phases of the beacon signals, and broadcasts data representing these relative phases. Mobile receivers, at unknown locations, receive these broadcast values, as well as beacon signals from at least three radio transmitters.

Each mobile receiver includes phase measurement circuitry that detects the phases of the beacon signals at the mobile receiver's current position. This is accomplished using a single radio receiver for receiving beacon signals at multiple distinct carrier frequencies. In the preferred embodiment, the phase measurement circuitry is implemented with a digital phase-locked loop (DPLL), including a digital phase detector coupled to the radio receiver and a loop filter implemented in software. The digital phase detector generates a phase error signal for each beacon signal. The DPLL is agile in the sense that a phase measurement for each beacon signal is generated in a time sequential manner.

In the preferred embodiment, each mobile receiver computes its location based on (A) the relative phase and frequency data broadcast by the fixed position observer, (B) the phases detected by the mobile receiver, and (C) the known positions of the transmitters and the fixed observer. In other embodiments, the phase information generated by the mobile receiver could be transmitted to a computer at a remote location, so that the position computations for many mobile receivers could be performed at a central data processing station. The position computations may occur in a timely manner, or they may be deferred and stored.

Even though the present invention determines the mobile receiver's absolute position with respect to a defined coordinate system, the invention does not require synchronization of clocks or time values between the mobile receivers and the fixed observer or any other time base. Rather, time is treated by the mobile receiver as an independent variable, much like the mobile unit's spatial coordinates (e.g., x, y, and z). Using the method of the present invention, relative time offsets between the fixed observer and the mobile receiver, as well as the mobile receiver's absolute position, are determined and maintained by the mobile receiver at a high level of accuracy.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
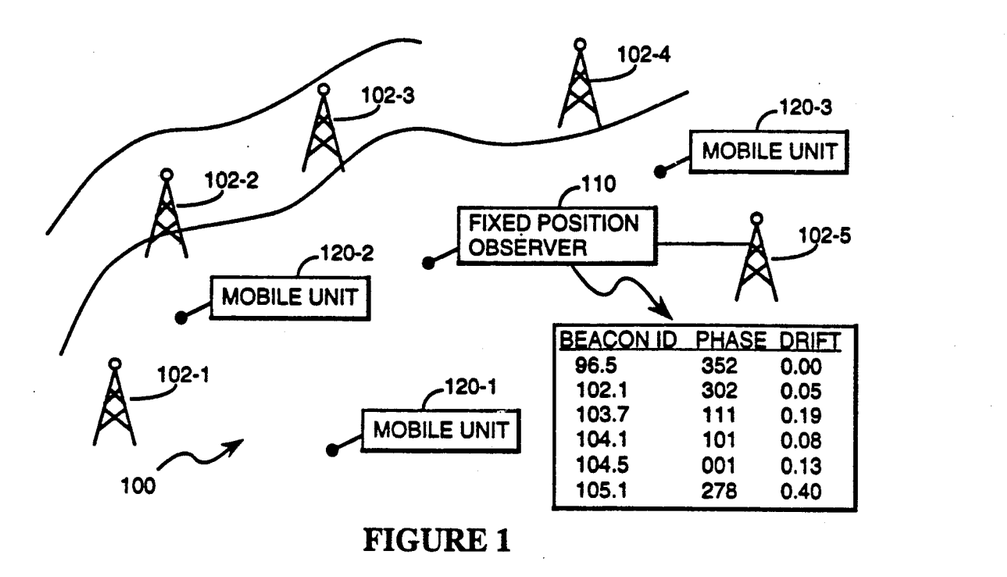
FIG. 1 schematically depicts a positioning system in accordance with the present invention.

Referring to FIG. 1, the positioning system 100 uses 19 kilohertz (KHz) pilot signals transmitted by existing commerical FM radio stations 102. Every commerical broadcast stereo FM station in the United States has a pilot signal, herein called a beacon, that runs at a rate of 19 kilohertz, plus or minus a frequency deviation of no more than two Hertz. There is no coordination of the phases of these signals between stations. FM radio station towers tend to be spaced around the periphery of major metropolitan areas, creating a set of transmitted beacons suitable for dense metropolitan use.

A fixed position observer 110 at a known position sequentially scans the FM radio band, receiving all the FM station pilot signals in the vicinity. Since its position is known, it can determine the relative phases of all the pilot signals, in terms of their phases at the point of broadcast. It also computes the frequency drift of each station, which is the difference between the station's pilot signal frequency and its nominal frequency, 19 KHZ. Periodically (e.g., once every 0.5 seconds) it broadcasts reference data representing the relative phases and drift rate values of all the FM pilot signals in its vicinity.

In the preferred embodiment, the fixed observer broadcasts model coefficients which are used by the receiving mobile unit in a shared predictive model of each beacon's drift. The use of these model coefficients reduces the rate at which reference data values need to be transmitted while still maintaining a high level of accuracy. This is particularly useful in applications in which the data link between the fixed observer and the mobile unit may be subject to periodic dropouts or is capacity constrained.

In most of the world, the base band of each commercial broadcast stereo FM station has a first frequency region in which the station's main program is transmitted, and a subsidiary frequency region, called the Subsidiary Communication Authorization (SCA) channel, in which additional programming can be transmitted. In the preferred embodiment, the fixed position observer 110 broadcasts reference data using the SCA channel of at least one FM station, and for greater reliability the SCA channels of at least two FM stations in each region that the system 100 is to be used. Alternately, the fixed position observer 110 could have its own radio transmitter for broadcasting reference data, or it could use any other available communication mechanism.

The system 100 can support an unlimited number of mobile receiver units 120 without increasing the amount of reference data required to be transmitted from the fixed observer unit 110. Each mobile unit 120 receives the broadcast reference data, as well as pilot signals from at least three (and preferably four or more) stations. By using the broadcast reference data to mathematically adjust the received FM pilot signals, the FM pilot signals are, in effect, coordinated. As a result, each mobile unit can compute its position and time.

Figure 2:
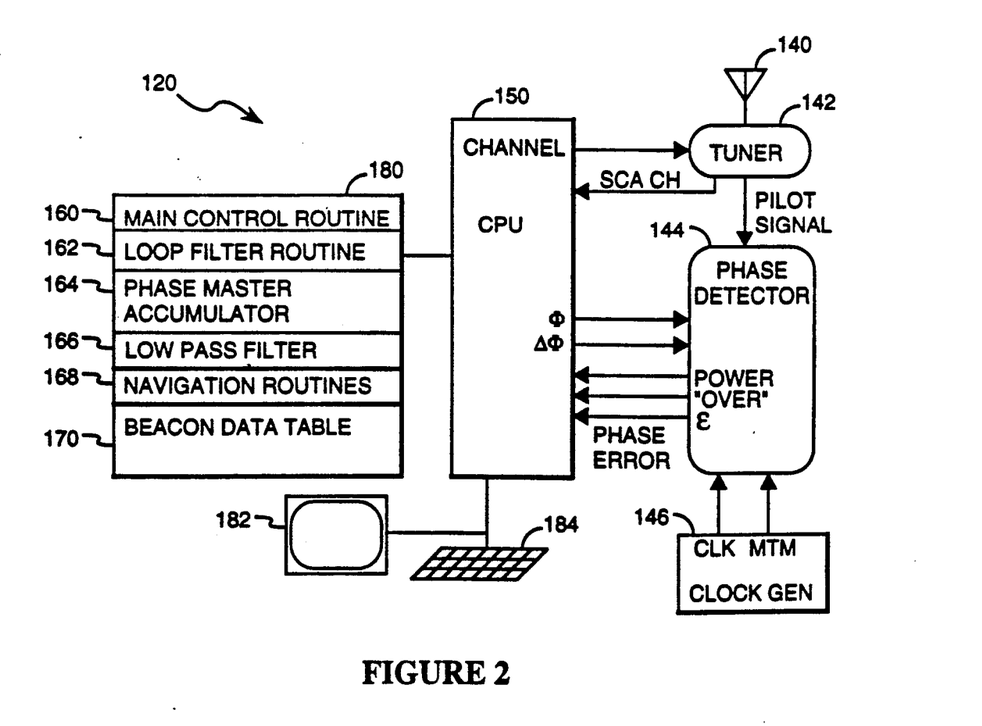
FIG. 2 is a block diagram of a mobile receiver unit.

Referring to FIG. 2, each mobile receiver unit 120 has an antenna 140 and a tuner 142 for receiving selected FM radio station signals and extracting its 19 KHz pilot signal from the baseband signal. A digital phase detector (PD) circuit 144 receives this baseband pilot signal. It also receives clock signals from a clock generator 146, as well as a starting phase value $\Phi$ and a "delta phase" value $\Delta\Phi$ from the unit's central processing unit (CPU) 150. These clock, phase and delta phase values are used by the PD 144 to generate a reference signal. The PD 144 compares the received baseband pilot signal with the reference signal, and generates corresponding phase error information.

In the preferred embodiment, the phase measurement circuitry is implemented with a digital phase-locked loop (DPLL), which includes the PD 144 working in conjunction with a loop filter implemented in software (i.e., running on CPU 150).

Tuner 142 is also used to receive broadcast reference data from a selected FM radio station's SCA channel, and to send the received phase data to CPU 150. The tuner 142 is by no means constrained to receiving only the reference data from one or more active SCA channels. It could also be used to receive other transmitted information of use to the mobile unit, or the system in which the mobile unit is used. An example of such use would be periodically updating the data base of antenna locations kept by the mobile unit. Alternately, a second tuner of similar design to tuner 142 could be employed solely for the reception of reference data.

The CPU 150, under software control, uses phase error information received from the PD 144 to compute and store the phase $\Phi$ (at the mobile unit's current position) and delta phase $\Delta\Phi$ of each beacon signal. The software routines 162-168 and data tables 170 used by the CPU to control operation of the mobile unit are stored in a data storage device or devices 180. For example, the software routines may be stored in read only memory, while data tables and other variables are typically stored in high speed random access memory. In the preferred embodiment, the CPU 150 is a 68000 microprocessor made by Motorola, although the initial prototypes of the invention were implemented using the 68030 microprocessor.

The mobile unit 120 may include a display 182 and keyboard 184, or equivalent user interface. In a typical application of the present invention, the user's position will be displayed as a position on a map, with the user being given the ability to zoom the displayed map in and out so as to be able to get different perspectives on the user's location. Alternately, in another application the mobile unit's present or past position(s) may be displayed at a remote location or time on one or more devices. Such displays may be automatically updated periodically, or as requested by a system user. The mobile unit's position may be transmitted in response to requests, or when certain events occur (such as the mobile unit 120 arriving at a selected location).

MAIN CONTROL ROUTINE-MOBILE UNIT

Figure 3:
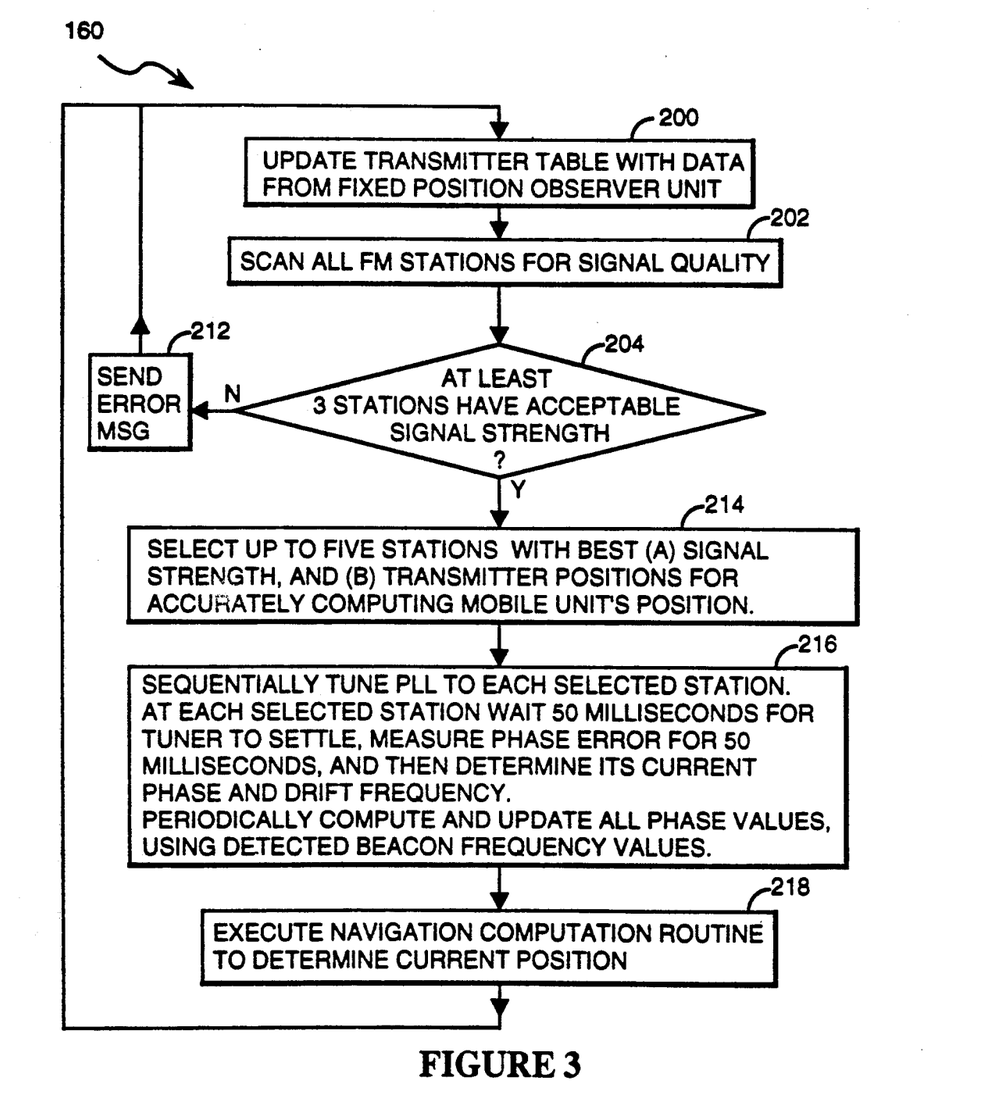
FIG. 3 is a flowchart of a the main control routine of a mobile receiver unit.

Referring to FIG. 3, the main control routine 160 of the mobile unit operates as follows. First, the mobile unit 120 tunes to the SCA channel on which the fixed observer unit 110 is transmitting its data, and updates its transmitter data table 170 with the received reference data values (step 200). The reference data from the fixed observer unit is an intermittently transmitted stream of data values in a form such as:

<beacon id 1, observed phase and freq. values 1, ref. time 1>
<beacon id 2, observed phase and freq. values 2, ref. time 2>
<beacon id 3, observed phase and freq. values 3, ref. time 3>

This data is herein referred to as the fixed observer reference data, or simply as the reference data. The reference data parameters represent the coefficients of a linear model of each beacon's phase, as a function of time t as defined by the fixed observer. The invention is not limited to a linear model, and those skilled in the art will recognize that other modeling is possible. The generation of linear model coefficients from the phase values measured by the fixed observer is discussed later in the section entitled "Fixed Position Observer Unit".

The parameters of the reference data relate to the linear model of the beacon phase, which can be written in point-slope form. The linear model is:

$$\Theta_n(t_u) = \omega_n \cdot (t_u - t_0) - \phi_n(t_0) \quad \text{(Eq. 1)}$$

where n represents the $n^{th}$ beacon t is the reference time as defined by the fixed observer $t_u$ is $t - \tau$, where $\tau$ is an offset due to receiver propagation delays and clock bias.

$t_0$ is an arbitrarily chosen reference time $\Theta_n(t_u)$ is the estimated phase of the $n^{th}$ beacon signal at its antennae as predicted by the fixed observer $R_n$ is the distance of the fixed observer from the $n^{th}$ beacon's antenna.

$\lambda_n$ is the wavelength of the $n^{th}$ beacon signal (approximately 15,789.5 meters)

$(t_0, \phi_n(t_0))$ is the model's point parameter at an arbitrary instance $t_0$ of the fixed observer time t.

$\Phi_n(t_0)$ is the phase at the $n^{th}$ beacon's antenna, which has been adjusted by the fixed observer by removing from the beacon's measured phase the value $2\pi R_n/\lambda_n$, where $\lambda_n$ is the wavelength of the $n^{th}$ beacon.

$\omega_n$ is the model's slope parameter, which is equal to the radian frequency of the $n^{th}$ beacon signal.

It can be seen that by using this model, the mobile observer can derive an estimate of the $n^{th}$ beacon's phase at an arbitrary time t.

The reference data need not be limited to just the model coefficients. Those skilled in the art will recognize that other data for ancillary purposes could also be included. In the preferred embodiment, the transfer or communication of the reference data is done in such a manner as to minimize the amount of bandwidth required.

The structure of the beacon data table stored in the mobile unit's memory 180 is shown in Table 1.

Note that in Table 1, Beacon_ID is the frequency, in MegaHertz, of the carrier signal. T_LOCTN indicates the position of the beacon's transmitter in terms of a predefined coordinate system. X_Phase is the phase of the signal at the transmitter, at time $T_0$, which is a specific instance of time t, as defined by the fixed observer unit. Drift is the difference between the frequency of the beacon signal and the mobile unit's 19 KHz local clock. C_Phase is the phase of the beacon at the mobile unit's current position at the time of the 100 millisecond time increment. Ac_Phase is the total accumulated phase of the beacon signal, after subtracting off the mobile unit's 19 KHz local clock.

TABLE 1

| Beacon ID | T LOCATN | X Phase | $T_0$ | Drift | C Phase | Ac Phase | ... |
|---|---|---|---|---|---|---|---|
| 096.5 | X1,Y1,Z1 | 5.11234 | 239.1 | 0.988 | 1.02344 | 43.12224 | ... |
| 102.1 | X2,Y2,Z2 | 1.23339 | 239.2 | 0.010 | 4.49876 | 54.00987 | ... |
| ... | ... | ... | ... | ... | ... | ... | ... |

Next, at step 202, the mobile unit scans FM stations to determine the quality of the beacons of interest. The beacons of interest can be derived from several sources, including A) all possible FM radio frequencies, B) those listed in the beacon data table 170, and C) those contained within the data received from the fixed observer unit 110. The quality of the beacon is comprised of two separate quality considerations of merit: (A) the caliber of the phase measurements made from the station's pilot tone, and (B) the contribution of error in the navigation solution due to the physical location of the mobile observer with respect to the beacon antennae.

The caliber of the phase measurements are derived from measurements of the phase error signal's variance. A large variance would indicate a poor caliber station, whereas a small variance would indicate a high caliber station. The caliber of the phase measurements is also influenced by how well the DPLL is tracking the beacon. The DPLL will require a finite time period to acquire a new beacon. During this time, the caliber of the phase measurement is less than after acquisition. Additionally, acceleration of the mobile observer will cause a finite tracking error within the phase-locked loop. During periods of acceleration, the caliber is less than during periods of constant velocity.

The contribution of error in the navigation solution due to the physical locations of the beacons' antennae is termed geometrical dilution of precision (GDOP). GDOP results from the magnification of normally inconsequential errors. Generally, GDOP will be minimized by a selection of beacons that are positioned at the widest possible spread of directions from the mobile unit. Note that if the mobile unit's position has been previously computed in the recent past (typically within the last couple of seconds), the approximate position of the mobile unit is known, even if the mobile unit is moving, with much more accuracy than is needed for selecting a set of beacons.

If the mobile unit's position is being computed for the first time since the system was powered on or reset, beacons are selected simply on geographic spread; a better set of beacons might be selected, after the mobile unit's position has been computed, on the next pass through the main routine.

If less than three of the stations have acceptable signal quality (step 204), an error message is sent to the user interface (step 212), and the main routine restarts at its beginning. Otherwise, the stations used for navigation computations are those with the highest quality.

Even though a minimum of three selected beacons will be used at any one time to compute the mobile unit's position, it is preferred to monitor additional spare stations so that if reception of one of used stations deteriorates, the mobile unit is able to immediately switch to a "spare" station for the purpose of computing its position. The phases of the spare stations are monitored along with the phases of the stations being used to compute the navigation solution. Additionally, the spare stations can be included in the navigation computation to improve the accuracy of its solution. The multiple beacon tracking ability of the DPLL provides the spare station capability at no additional cost.

Next, the tuner is sequentially tuned to each of the selected beacons for a period of 100 milliseconds per station. Considering the handling of a particular beacon during this 100 millisecond period, the first 50 milliseconds are utilized to allow the tuner to settle, and during the second 50 milliseconds, phase error values from the PD 144 are accumulated in a register 409 (see FIG. 8) for use by the loop filter routine 406 (see FIGS. 8 and 9). The accumulated phase error values are then used to compute the drift frequency, the delta phase, and the phase of the pilot signal (step 216). These phase values then update that particular beacon's data in the beacon data table 170. Also computed and stored in the beacon data table 170 are its current phase and accumulated phase (C_Phase and Ac_Phase in Table 1).

The other selected beacons are then adjusted using their previously collected data values so that their accumulated phase values all represent the phase of the corresponding pilot signal at consistent instances in time. This is done simply by adding or subtracting the phase shift associated with the proper number of 100 millisecond intervals. Note that if the pilot signal's frequency were to be exactly 19,000 hertz, the pilot signal's accumulated phase at time T and its value at time T+100 milliseconds are the same. Therefore, to adjust a beacon signal's stored phase value for the passage of 100 milliseconds of time, the mobile unit's CPU just adds 0.1 times the value of the pilot signal's drift frequency to the previously stored phase value.

Figure 4:
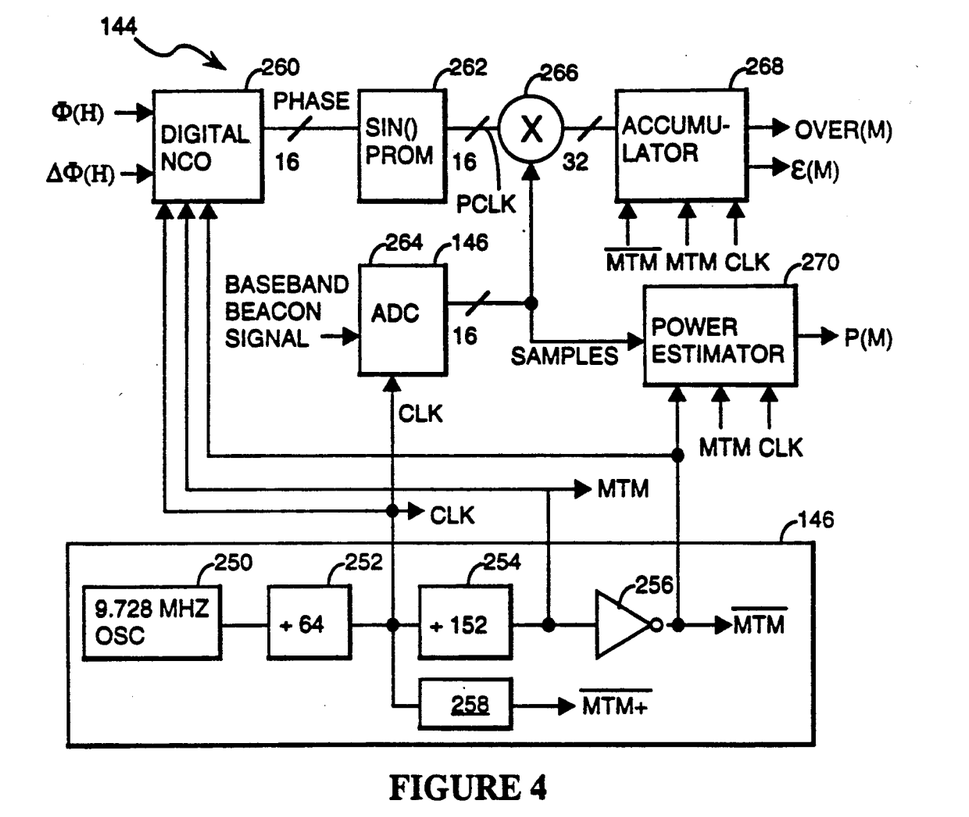
FIG. 4 is a block diagram of a digital phase detector for use in both mobile receiver units and a fixed position observer unit.

The DPLL is made agile by the combination of tuning the radio receiver and loading the corresponding beacon's current phase value (from the beacon data table 170) into a digital numerically controller oscillator (NCO) 260 (FIG. 4).

The manner in which the frequency and phase of each pilot signal are computed is discussed in more detail below with respect to FIGS. 4 through 11. On a periodic basis (e.g., once per second), a navigation routine 168 is executed that computes the mobile unit's current position (step 218) based on the data stored in the beacon data table 170. The measurement of phase by the DPLL continues to operate in parallel with the navigation routine.

PHASE DETECTOR CIRCUIT

The digital phase-locked loop (DPLL) used by the preferred embodiment is implemented with a digital phase detector 144, and a software loop filter. The DPLL can measure a beacon's phase with an error on the order of 0.000096 radians. Since the wavelength of a 19 KHz signal is about ten miles (actually 15,789.5 meters), this level of precision is necessary to achieve a resolution of about one fourth of a meter.

A single phase detector 144, coupled to a single receiver/tuner, is used to process all the selected pilot signals. By using the same physical circuitry for all signals, approximately the same phase delay through the circuitry occurs for all received signals. This common mode phase delay is eliminated by the navigation algorithm. A differential mode phase error of even 0.01 radians, due to differing propagation delays for distinct tuner and/or phase detector circuits, would cause a positioning error on the order of 25.1 meters. Thus, using a single tuner and phase detector helps to minimize positioning error.

Referring to FIG. 4, inputs to the phase detector (PD) 144 are the baseband pilot signal from the tuner 142, plus the following signals:

CLK a clock signal running at 152 KHz (i.e., eight times faster than a 19 KHz pilot signal);

MTM a clock signal running at 1 KHz and which is enabled during only one of each 152 cycles of the CLK signal;

$\overline{MTM}$ the inverse of MTM;

$\Delta\Phi$ the last computed delta phase of the pilot signal being processed; and $\Phi$ the predicted phase of the pilot signal at the beginning of the next one millisecond signal processing period.

The clock generator 146 uses an oscillator 250 and divider 252 to generate the 152 KHz CLK signal, followed by a counter circuit 254 that generates the MTM signal, and an inverter 256 that generates $\overline{MTM}$. A parallel circuit 258 generates a delayed one millisecond clock signal $\overline{MTM}+$ that is delayed from the $\overline{MTM}$ clock by about 0.000003289 seconds (i.e., by one half cycle of the 152 KHz CLK signal).

The choice of a 9.728 MHz clock oscillator 250 and (divide by 65) divider 252 circuits was not arbitrary, but represents the operating frequency region in which quartz crystals can be cut so as to be the most stable over time. Thus the preferred embodiment utilizes inexpensive yet stable components for the clock generator 250.

A digital numerically controlled oscillator (NCO) 260 generates a linearly increasing signal (modulo $2^{32}$) called PHASE, which not only increases at a frequency $(19,000+\Delta\Phi/152,000)$ closely matching that of the pilot signal, but also starts at a previously computed phase value $\Phi$ stored in beacon data table 170. The PHASE value is converted into a sinusoidal signal PCLK by using the PHASE value as the address of a SIN( ) function table stored in a PROM 262. The PCLK signal is, in essence, a reference clock that will be compared by the Phase Detector 144 with the baseband beacon signal.

In parallel with the NCO 260 and PROM 262, an analog to digital converter (ADC) 264 samples the baseband pilot signal at a rate of 152 KHz. Each sampled pilot signal value is multiplied with a corresponding sample of the PCLK signal by multiplier 266. During each one millisecond period, 152 consecutive multiplication products are received and added to one another by accumulator 268, generating a new phase error value $\epsilon(M)$ once every millisecond.

In both the hardware and software diagrams and equations in this description, the index value M indicates that a new value of the indexed quantity is generated every millisecond.

POWER ESTIMATOR CIRCUIT

Figure 5:
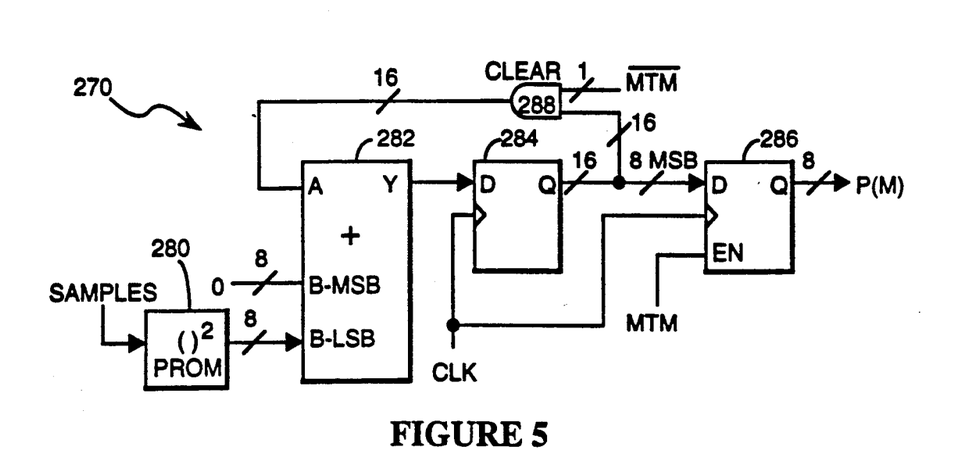
FIG. 5 is a circuit diagram of a power estimator circuit.

Power estimator circuit 270 also receives the samples of the pilot signal, and generates a power estimation value P(M) once each millisecond. As shown in FIG. 5, the power estimator 270 first multiplies each pilot signal sample by itself using a PROM 280 storing an appropriate set of values. The resulting squared values are added to one another for 152 consecutive CLK clock cycles by adder 282 and flip-flop 284, and the most significant eight bits of the resulting total are loaded into flip-flop 286 to generate the value P(M). The P(M) value is held for one millisecond, providing a period of time in which it can be read and stored by the unit's CPU 150.

The accumulated power value held by the power estimator circuit 270 is cleared once every millisecond by turning off AND gate 288 with the $\overline{MTM}$ signal, thereby loading a value of zero into the A port of adder 282.

DIGITAL NUMERICALLY CONTROLLED OSCILLATOR (NCO)

Figure 6:
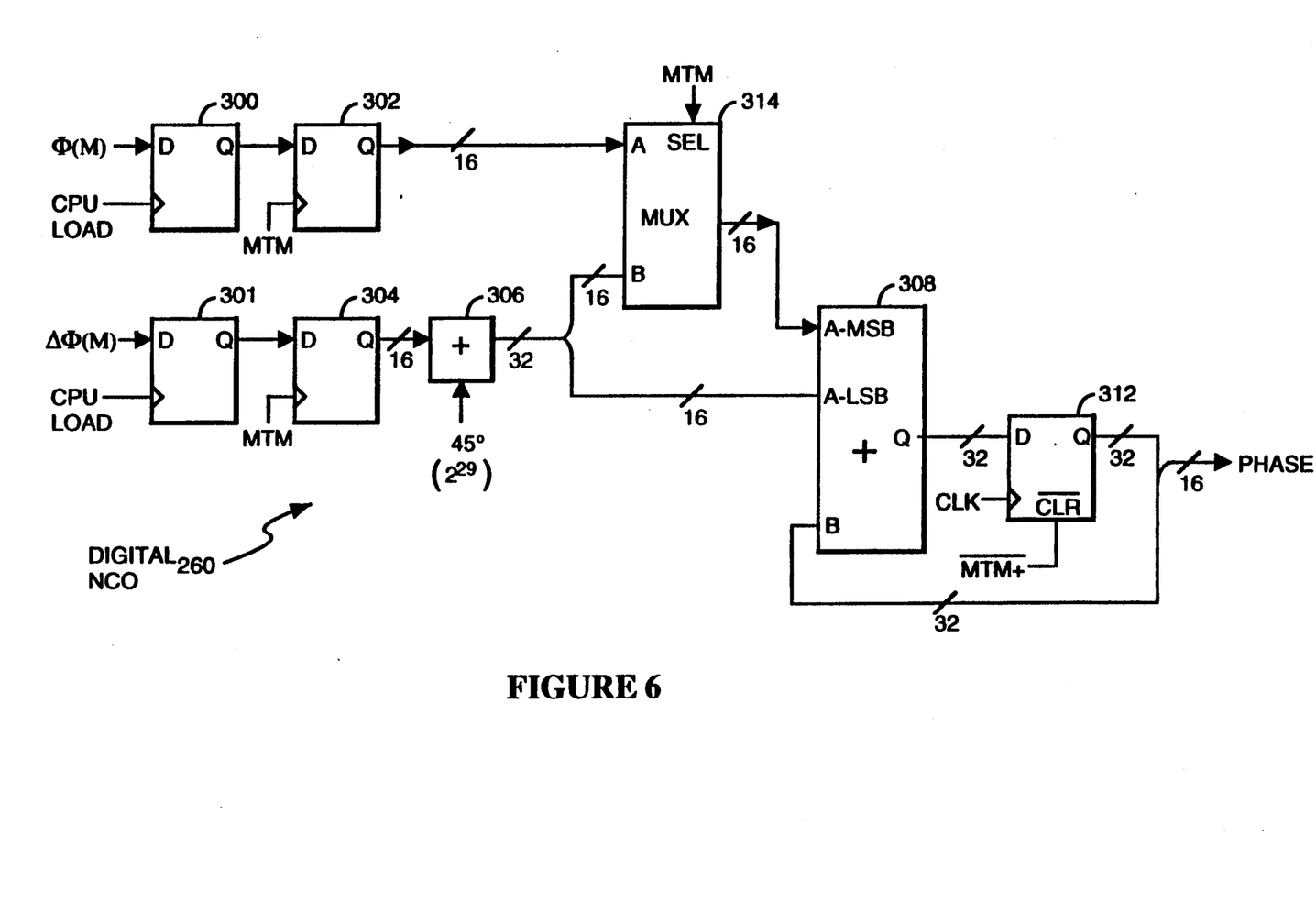
FIG. 6 is a circuit diagram of a numerically controller oscillator (NCO).

Referring to FIG. 6, the digital NCO 260 works as follows. Only one beacon signal is sampled and analyzed during each 100 millisecond period in order to produce a phase, delta phase, and drift frequency value. The digital NCO 260 generates new PHASE values 152 times per millisecond, using a new starting phase value once every millisecond.

The theory of operation of the Digital NCO is as follows. The digital NCO 260 generates a PHASE value which is updated, or incremented, about eight times per 19 KHz clock cycle. This PHASE value tracks, as accurately as possible, the phase of a selected beacon signal using a previously measured drift frequency value.

As implemented here, the beacon signal's frequency has two components: (1) a 19 KHz component, which causes the phase of the beacon signal to increase by $\pi/4$ radians during each clock period of the 152 KHz CLK signal, and (2) a delta phase component, which causes the phase of the beacon signal to increase by $\Delta\Phi$ during each clock period of the CLK signal. In essence, the Digital NCO circuit 260 computes a value using the following equation:

$$\text{PHASE}(I) = \text{PHASE}(I-1) + \pi/4 + \Delta\Phi \qquad \text{(Eq. 2)}$$

where I represents discrete time taken at the 152,000 Hz clock rate.

Prior to the beginning of each one millisecond time slot, the CPU loads a starting phase value $\Phi$ into flip-flop 300 and a delta phase value $\Delta\Phi$ into flip-flop 301. At the beginning of the one millisecond time slot, marked by MTM=1 and $\overline{MTM}=0$, these values are shifted into flip-flops 302 and 304. The delta phase value is added by Adder 306 to $2^{29}$, which represents a phase shift of $\pi/4$ radians. Thus, except during the first clock cycle after MTM=1, the digital 32-bit value at input Port A to Adder 308, is equal to $\pi/4 + \Delta\Phi$.

The value presented to input Port B of Adder 308 is the previously computed PHASE value, stored in flip-flop 312.

At the beginning of each one millisecond time slot, multiplexer 314 selects port A, thereby presenting the phase value in flip-flop 302 to port A of the adder 308. Flip-flop 312 is cleared by the $\overline{MTM}+$signal one-half clock cycle after MTM becomes active. As a result, a value of zero is presented to the B port of the adder 308. At the next clock cycle after MTM=1, the output of the adder is equal to $\Phi+\Delta\Phi$, and that value is loaded into flip-flop 312. For each of the next 151 clock cycles of the CLK signal, a value of $\pi/4 + \Delta\Phi$ is added to the previously computed PHASE value and stored in flip-flop 312.

Referring back to FIG. 5, the most significant sixteen bits of the computed PHASE value is converted by the PD 144 into a sine waveform, and then multiplied with the actual beacon signal to generate a phase error value ε.

PHASE ERROR ACCUMULATOR

Figure 7:
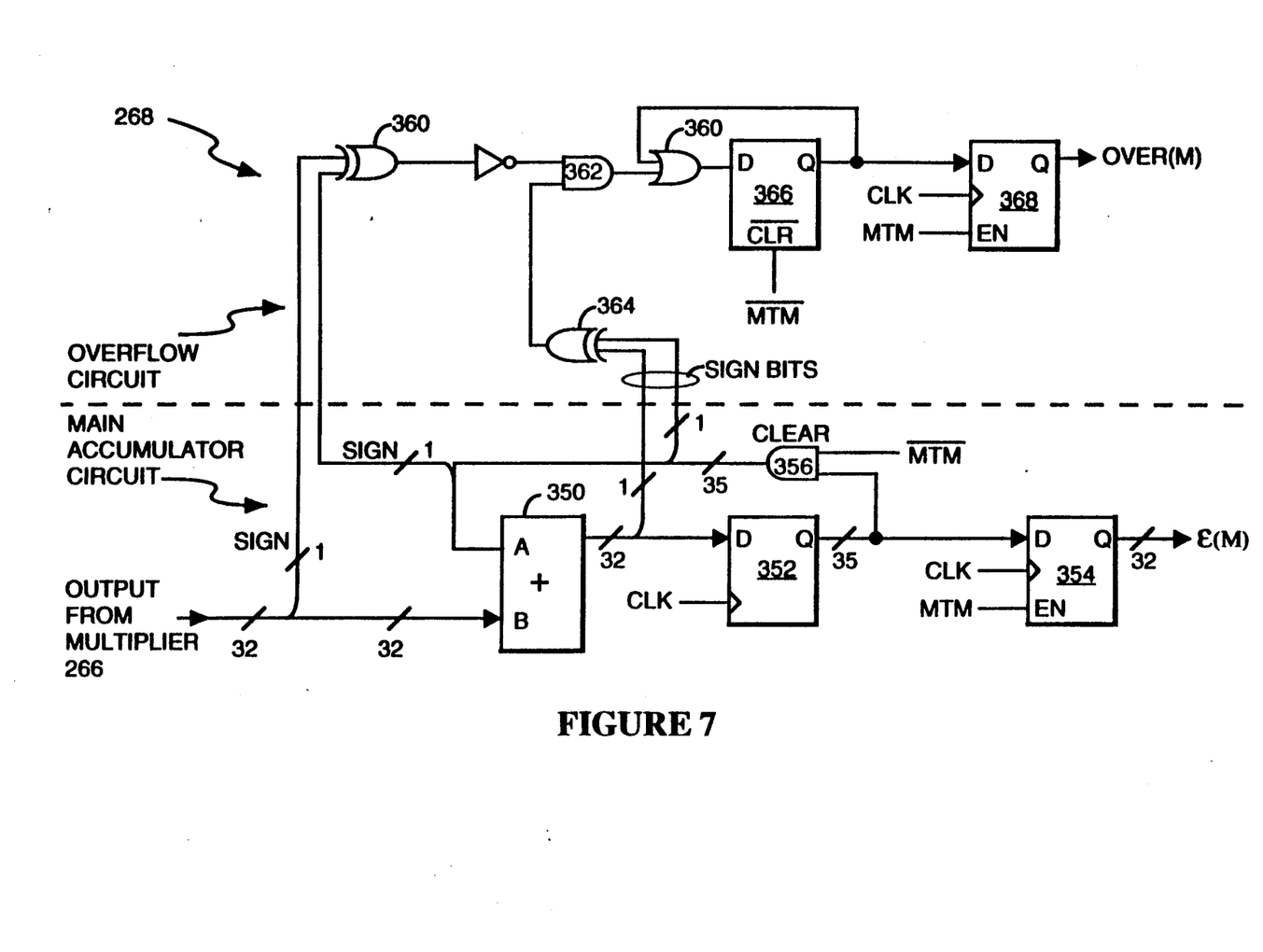
FIG. 7 is a circuit diagram of a phase error accumulator circuit.

Referring to FIG. 7, the main part of accumulator circuit 268 is very simple. The 32-bit values generated by multiplier 266 (see FIG. 4) are accumulated by adder 350 and flip-flop 352 for 152 cycles of the CLK signal, with the resulting total value being stored in flip-flop 354 at the end of each one millisecond cycle. Furthermore, AND gate 356 causes the accumulated value in flip-flop 352 to be cleared at the beginning of each one millisecond cycle and replaced with the next 32-bit value from multiplier 266.

The remaining portion of accumulator circuit 268 is a well known overflow detection circuit which operates by comparing sign bits. In particular, there can be no overflow if the two inputs to adder 350 have different sign bits. Thus, XOR gate 360 puts out a "1" if the A and B inputs to adder 350 have different signs, which disables AND gate 362.

Furthermore, if the previous and current outputs of Adder 350 have the same sign bit value, the Adder did not overflow. Therefore XOR gate 364 outputs a "0" when the previous and current outputs of Adder 350 have the same sign bit value, which disables AND gate 362.

Overflow is detected when (A) the Sign bits of the multiplier input value and the accumulated phase error value in flip-flop 352 have the same sign bit value, and (B) the previous and current outputs of the Adder 350 have unequal sign bit values. When this happens, AND gate 362 outputs a "1", which is stored in flip-flop 366 for the duration of the one millisecond period, and which is then transferred to flip-flop 368 for reading by the CPU 150. The loop filter software ignores phase error values from each one millisecond period in which the accumulator circuit indicates that an overflow condition was detected.

The phase error value ε in flip-flop 354 is read by the CPU 150 for use by the loop filter software.

SUMMARY OF PHASE DETECTOR CIRCUIT FUNCTION

In summary, the PD 144 is tuned to a new beacon signal every 100 milliseconds. After giving the tuner fifty milliseconds to settle, the PD circuit generates three values (estimated signal power, phase error, and a phase error overflow indicator) once every millisecond for fifty consecutive millisecond periods. These values are passed to the CPU 150.

Using previously measured phase and drift values, the software periodically (i.e., once every 100 milliseconds) updates the predicted phase for the other selected beacon signals that are being monitored. As a result, the CPU maintains at all times a phase value Φ, delta phase value ΔΦ and drift frequency for all the beacon signals it is using, not just for the one beacon signal that the PD circuit 144 is currently receiving. The procedure for maintaining these phase values will be discussed below, in the section entitled PHASE TRACKING SOFTWARE.

PHASE TRACKING SOFTWARE

Referring to FIGS. 8-11, the phase tracking software (used by both the mobile unit and the fixed observer unit) performs the following functions. An automatic gain control routine 400 low pass filters the signal's power (using low pass filter routine 402), and attenuates the phase error signal by a factor inversely proportional to the beacon signal's power.

Figure 8:
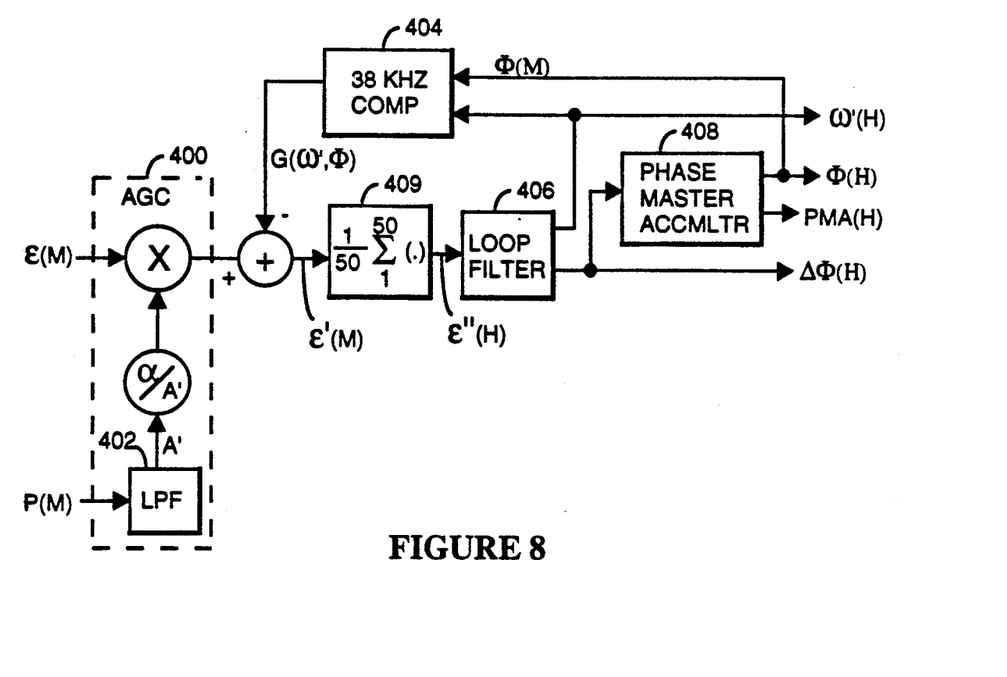
FIG. 8 is a block diagram of a loop filter routine executed by the CPU in mobile receiver units, and also by the CPU in a fixed position observer unit.
Figure 9:
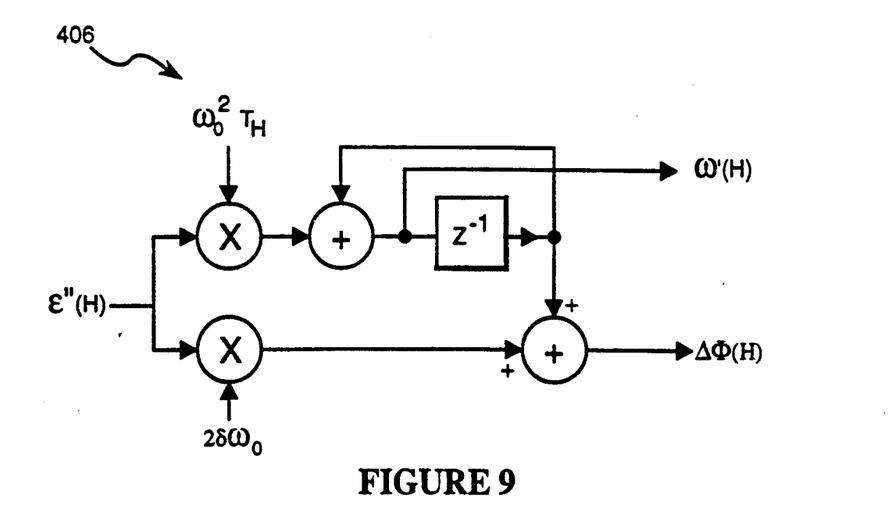
FIG. 9 is a block diagram of a loop filter subroutine.
Figure 10:
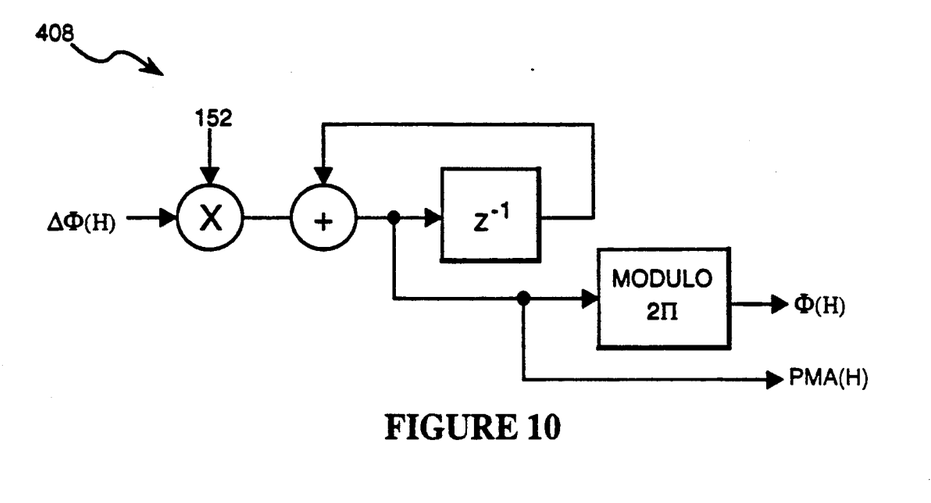
FIG. 10 is a block diagram of the phase master accumulator software routine.

Another routine 404 uses the phase and drift frequency to remove 38 KHz noise. The resulting filtered error signal ε' is summed and averaged over fifty one-millisecond periods by routine 409 to generate error signal ε''. Loop filter 406 then low pass filters this phase error signal ε'' to generate delta phase value ΔΦ and drift frequency value ω'. A phase master accumulator routine 408 computes a new phase value in two forms: PMA, which represents the total amount of phase movement of the "drift frequency" portion of the beacon signal since the mobile unit was powered on or reset (i.e., excluding phase movement of the 19 KHz portion of the beacon signal), and Φ, which is the current phase value modulo 2π radians.

After computing these values for the beacon signal which was last processed by the phase detector circuit 144, the CPU then updates the phases of the other beacon signals using PHASE update equation Eq. 3:

$$PMA_n(t_M) = PMA_n(t_{M-1}) + \omega_n'(t_{M-1}) \cdot (t_M - t_{M-1}) \qquad (Eq. 3)$$

where
- $t_M$ is the time to which the $n^{th}$ beacon signal phase is being updated
- $t_{M-1}$ is the time corresponding to the phase value stored for the $n_{th}$ beacon signal in the CPU's beacon data table
- $\omega_n'( )$ is the radian drift frequency of the $n^{th}$ beacon signal If the stored beacon signal phases are updated once every 100 milliseconds, then $t_M - t_{M-} = 100$ milliseconds.

Operating on the assumption that each of four beacon signals is processed about once every half second, the CPU needs to store certain state variables so as to enable operation of the software filters. These state variables, listed in TABLE 2 herein, are stored in the beacon data table 170. These state variables, excluding those listed in TABLE 1, are the low pass filtered delta phase value ΔΦ, the low pass filtered signal power value P', and the low pass filtered drift frequency value ω'.

TABLE 2

| Beacon ID | ΔΦ | P' | ω' |
|---|---|---|---|
| 096.5 | 0.03122 | 1.00101 | 0.988 |
| 102.1 | 0.12109 | 1.23339 | 0.010 |
| ... | ... | ... | ... |

Figure 11:
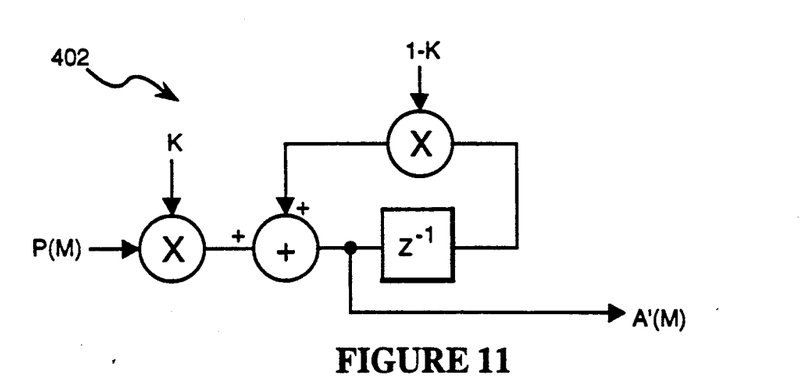
FIG. 11 is a block diagram of a low pass filter routine.

Referring to FIGS. 8 and 11, the signal power P(M) of the beacon signal is low pass filtered to generate a filtered power value P'(M):

$$P'(M) = K \cdot P(M) + (1-K) \cdot P'(M-1) \qquad (Eq. 4)$$

where P(M) is the most recently measured signal power value, P'(M−1) is the previously computed filtered power value, and K is a preselected filter parameter having a value selected for proper bandwidth. A typical value of K is less than 0.1.

The amplitude of the sinusoid is recovered from the power measurement by the following equation:

$$A'(M) = \sqrt{P'(M)/\beta}$$

where $A'(M)$ is the amplitude, $P'(M)$ is the sinusoidal power, and $\beta$ is a scaling constant, typically about 56.

The AGC routine 400 attenuates the phase error signal $\epsilon$ by a factor of $\alpha/P'$, where $\alpha$ is an attenuation factor selected for unity loop gain and $A'$ is the low pass filtered signal amplitude.

Next, routine 404 removes 38 KHz noise from the phase error signal $\epsilon$. In particular, when the multiplier circuit 266 in the PD 144 multiplies a computed waveform with the actual beacon signal, two signal components are generated: a low frequency component with a frequency equal the difference between the two signals, and a high frequency component with a frequency equal to the sum of the two frequencies. After filtering by the accumulator 268, this second component is small, though it is still significant enough to distort the phase error signal $\epsilon$. 38 KHz compensation routine 404 computes a value $G(\omega',\Phi)$, corresponding to the unfiltered residual high frequency component of the phase error signal, which is then subtracted by the CPU's software from the phase error signal $\epsilon$. $G(\omega',\Phi)$ is computed using the following equation:

$$G(\omega',\Phi) = \frac{\sin(2WT(N-1)+2\Phi) - \sin(2WTN+2\Phi) + \sin(2WTN-2\Phi) + \sin(2\Phi)}{4 - 4\cos(2WT)} \quad \text{(Eq. 5)}$$

where
$W = 2\pi \cdot 19{,}000 + \omega'$
$N = 152$
$T = 1/152{,}000$

The resulting adjusted phase error value $\epsilon'$ is averaged by low pass filter routine 409 and then processed by a loop filter routine 406, shown in diagrammatic form in FIG. 9. This is a "proportional" and "integrated" signal control routine, in which the delta phase value $\Delta\Phi$ and drift frequency $\omega'$ are periodically updated in accordance with the following equations:

$$\omega'(H) = \omega_0^2 T_H \epsilon''(H) + \omega'(H-1) \quad \text{(Eq. 6)}$$

$$\Delta\Phi(H) = 2\delta\omega_0 \epsilon''(H) + \omega'(H-1) \quad \text{(Eq. 7)}$$

where $T_H$ is the hop rate, i.e., the rate at which each station is examined. In the preferred embodiment $T_H$ is nominally 0.5 seconds. $\omega_0$ is the natural frequency, in the preferred embodiment $\omega_0$ is nominally 0.1 radians per second. $\delta$ is the damping coefficient, which in the preferred embodiment is nominally 0.707.

POSITION DETERMINATION

Periodically, after the CPU has computed the current phase value of the selected beacon signals, it determines the mobile unit's current position. In the preferred embodiment, the navigation software 168 is performed concurrently with the mobile unit's signal processing software.

Assuming initially that at least four beacon signals were available, position determination is performed as follows.

The phase $\Phi_n(t)$ of each beacon signal at time t, where n is an index identifying particular beacons is represented as:

$$\Phi_n(t) = \phi_n(t_0) + \omega_n(t_0) \cdot (t - t_0) - \frac{2\pi R_n}{\lambda_n(t_0)} \quad \text{(Eq. 8)}$$

where t is time as defined by the fixed observer,
$t_0$ is a specific instance of time chosen by the fixed observer,
$\phi_n(\ )$ is the phase of beacon n at its antenna at $t_0$
$R_n$ is the distance of the mobile user from the $n^{th}$ beacon's antenna
$\lambda_n(\ )$ is the wavelength of the pilot tone (approximately 15,789.5 meters)
$\omega_n(\ )$ is the radian frequency of the $n^{th}$ beacon A problem with Equation 8 is that $\Phi_n(t)$ is not directly observable. In practice, the mobile unit can observe phase only after it has propagated through its receiver, thus being delayed by an amount $\tau$. In other words, the mobile unit can only observe the phase which occurred $\tau$ seconds in the past. Thus, we modify Equation 8 as follows:

$$\Phi_n(t-\tau) = \phi_n(t_0) + \omega_n(t_0) \cdot (t - t_0) - \frac{2\pi R_n}{\lambda_n(t_0)} - \omega_n(t_0) \cdot \tau \quad \text{(Eq. 9)}$$

where $\tau$ is an offset in time at the mobile unit due to clock bias or delays within its receiver.

Equation 9 can be re-arranged to yield:

$$Gn = 0 = \frac{\lambda_n(t_0)}{2\pi} \{-\Phi_n(t_u) + \phi_n(t_0) + \omega_n(t_0) \cdot (t_u - t_0)\} - \sqrt{(x - x_n)^2 + (y - y_n)^2 + (z - z_n)^2} \quad \text{(Eq. 10)}$$

where $t_u = t - \tau$ is the effective time seen by the user
$x, y, z$ is the position of the mobile unit at time $t_u$
$x_n, y_n, z_n$ is the position of the $n^{th}$ beacon's transmitter Repeating Equation 10 for four beacons, and suppressing the equations' dependency upon time for the sake of clarity, yields a set of four equations with four unknowns (x, y, z and $t_u$). The resulting vector of equations can be represented as:

$$G = [G1, G2, G3, G4] \quad \text{(Eq. 11)}$$

Further, we define a vector of position variables $p = [t_u, x, y, z]$.

The Jacobian for this set of equations is:

$$J = \begin{bmatrix} \frac{\partial G1}{\partial t_u} & \frac{\partial G1}{\partial x} & \frac{\partial G1}{\partial y} & \frac{\partial G1}{\partial z} \\ \frac{\partial G2}{\partial t_u} & \frac{\partial G2}{\partial x} & \frac{\partial G2}{\partial y} & \frac{\partial G2}{\partial z} \\ \frac{\partial G3}{\partial t_u} & \frac{\partial G3}{\partial x} & \frac{\partial G3}{\partial y} & \frac{\partial G3}{\partial z} \\ \frac{\partial G4}{\partial t_u} & \frac{\partial G4}{\partial x} & \frac{\partial G4}{\partial y} & \frac{\partial G4}{\partial z} \end{bmatrix} \quad \text{(Eq. 12)}$$

Next, we iteratively solve the equation:

$$p_{i+1} = p_i - J^{-1}(p_i)G(p_i), \quad i = 0, 1, 2, \ldots \quad \text{(Eq. 13)}$$

until x, y, z and $t_u$ converge.

In our system, with well chosen beacons, the Jacobian matrix is always invertible. The individual elements of the Jacobian matrix are numerically computed as follows:

$$\frac{\partial Gn}{\partial t_u} = c = \text{the speed of light} \approx 3 \times 10^8 \text{ m/sec} \quad \text{(Eq. 14)}$$

$$\frac{\partial Gn}{\partial x} = -\frac{x - x_n}{R_n} \quad \text{(Eq. 15)}$$

$$\frac{\partial Gn}{\partial y} = -\frac{y - y_n}{R_n} \quad \text{(Eq. 16)}$$

$$\frac{\partial Gn}{\partial z} = -\frac{z - z_n}{R_n} \quad \text{(Eq. 17)}$$

$$R_n = \sqrt{(x - x_n)^2 + (y - y_n)^2 + (z - z_n)^2} \quad \text{(Eq. 18)}$$

where
x,y,z is the position of the mobile unit
$x_n, y_n, z_n$ is the position of the $n^{th}$ beacon's transmitter To solve for the mobile unit's current position, the mobile unit makes a first guess as to the value of the $p = [t_u, x, y, z]$ vector, and assigns that value to $p_0$. Using this value, the sixteen elements of the Jacobian matrix in Equation 12 are computed using Equations 14 through 18. Then the matrix is inverted, and Equation 13 is evaluated to generate a new estimate $p_1$ of the mobile unit's position. This process is repeated until the values of $t_u$, x, y, and z converge. As is well known to those skilled in the art of numerical methods, "convergence" is typically defined as $$(t_{u_{i+1}} - t_{ui})^2 + (x_{i+1} - x_i)^2 + (y_{i+1} - y_i)^2 + (z_{i+1} z_i)^2 < L1$$

or as $$(t_{u_{i+1}} - t_{ui}) < L2_t, \, (x_{i+1} - x_i) < L2_x, \, (y_{i+1} - y_i) < L2_y, \, \text{AND} \, (z_{i+1} - z_i) < L2_z$$

where L1 and $L2_t - L2_z$ are preselected convergence criteria.

As can be seen, the above described computational process not only solves for the mobile unit's position {x,y,z}, it also solves for time $t_u$. In other words, the mobile unit has sufficient data from its measurements to compute the value of time, and for this reason, it is unnecessary for the mobile unit to explicitly coordinate its "clock" with that of the fixed observer unit. Conceptually, the $t_u$ value computed by the navigation software 168 represents the amount of elapsed time between the fixed observer's phase measurements and the mobile unit's phase measurement, plus (A) a time value corresponding to phase shifts caused by propagation of signals through the mobile unit's receiver, and (B) a time value corresponding to the difference between the clock rates of the mobile unit and the fixed observer unit.

It is important to note that the clock rates of the mobile units do not have to be precisely tuned to that of the fixed observer because any difference in the two clock rates simply becomes a common phase shift for all the received beacons.

NAVIGATION WITH ONLY THREE BEACON SIGNALS

As shown in FIG. 3, the present invention can be used even when only three beacon signals of sufficient quality are available. In that case, the navigation software 168 solves only for time, x and y, and does not solve for the mobile unit's altitude. Instead, it is presumed that the mobile unit is at a mathematically fixed altitude. This is based on the assumption that most user's are not as interested in their altitude as in their latitude and longitude. In the three beacon case, the position vector is $p = \{t_u, x, y\}$, and the Jacobian matrix is:

$$J = \begin{bmatrix} \frac{\partial G1}{\partial t_u} & \frac{\partial G1}{\partial x} & \frac{\partial G1}{\partial y} \\ \frac{\partial G2}{\partial t_u} & \frac{\partial G2}{\partial x} & \frac{\partial G2}{\partial y} \\ \frac{\partial G3}{\partial t_u} & \frac{\partial G3}{\partial x} & \frac{\partial G3}{\partial y} \end{bmatrix} \quad \text{(Eq. 19)}$$

Equation 13 remains unchanged, except that the vectors and matrix now have fewer elements, and the iterative process for computing the mobile unit's position remains the same as described above.

USER INTERFACE

The present invention does not require any specific user interface for communicating the computed mobile unit's position. Typically, in motor vehicle applications, the mobile unit's current position will be displayed by indicating a position on a map that is displayed on a computer display device. However, other types of user interfaces may be used, depending on the user's requirements.

INITIALIZING THE NAVIGATION ROUTINE

One problem with the invention as described so far is that the system needs an initial estimate of the mobile unit's position that is correct to within a few miles. Given such an estimate, the system as described will use the estimate as an initial guess, and then will quickly converge to the correct user position.

However, the solution to the navigation equations presented above is not guaranteed to be unique. If the initial estimate of position is too far in error, the system may converge to a solution that does not represent true user position but is otherwise consistent with observations. The fundamental cause of this behavior is the fact that the waveform being tracked (i.e., a 19000 Hz sinusoid) has a wavelength of only 15.6 kilometers (about ten miles). That is, once every 15.6 Km, the pilot tone repeates. Without extra information, the system is incapable of determining which cycle of the pilot tone is being received by the mobile unit. Thus, there is a potential ambiguity problem.

There are several method for obtaining the information required to resolve this ambiguity.

In some implementations, such as systems in which a human operator is always present (e.g., in an automobile navigation system), the system can be programmed simply to ask the user to specify the system's approximate position each time that the system is powered on. Since the wavelength of the beacons is about ten miles, the user needs only to specify the system's position within about five miles. This may be done by displaying a map on a touch screen display and asking the user to indicate his/her position by touching the corresponding position on the screen. For a system used over a wide geographic region, this process could take several steps, for example starting with a national map in which the user specifies the general region of the system, moving then to a map covering a region the size of one or two states, and then moving to a more local map for a final pinpointing of the user's position within five miles.

Given this approximate starting position, the navigation system will collect phase measurement data and then execute its navigation software 168 to precisely determine the system's position with a high degree of accuracy. In one preferred embodiment, the mobile unit's last computed position is stored in non-volatile memory (such as an EEPROM), and that position is used as the $p_0$ value the first time the mobile unit computes its position after power up or reset. Position need be re-entered by the user only when the mobile unit's position changes significantly while the mobile unit is off.

In the preferred embodiment, the mobile unit's position is typically recomputed about every 0.5 seconds. Lower cost implementations, using slower microprocessors, might recompute position less often. Even if the mobile unit is moving at a rather high rate of speed, such as 1000 Kilometers/hour in an airplane, the previously computed position will still be relatively close to the new position, and therefore the computation will typically converge after a few iterations of the above describe computation.

Another method of resolving the ambiguity problem is to take advantage of otherwise minor imperfections in the beacons to set up mathematical "virtual beacons" with ambiguity ranges far larger than 10 miles. This can be accomplished because, though the frequency of the beacons is nominally 19,000 Hz, FCC regulations allow a $\pm 2$ Hz deviation from this ideal. Observed deviations are typically within $\pm 1.2$ Hz from the ideal.

Consider a set of beacons taken pair-wise. Let these beacons have slightly different frequencies. Considering only two such beacons for the moment, a comparison of the phases of these two beacons results in a beat frequency which is a function of the frequency separate of the two. For example, if the frequency of the two stations is separated by 2 Hz, then the difference between the two phases will repeat at most once every half second. This sets up an effective virtual beacon with a wavelength equal to the speed of light divided by the separation in frequencies. Again using a 2 Hz separation as our example, the effective wavelength is approximately 150,000 Kilometers. Making the rather safe assumption that we are within a few hundred kilometers of the beacons, that is, that we are on the surface of the planet and within range of both beacons, we are clearly within the first region of repetition for this virtual beacon, and reject subsequent repetitions as possibilities.

Plainly, four beacons can be used to set up four different virtual beacons in this fashion, and these virtual beacons can be used to solve for user position in almost the same fashion as is used for the actual beacons as described above. The longer wavelength implies a decrease in solution accuracy, but our purpose is only to obtain an approximate solution as an initial estimate for use with the navigation equations that use actual beacons.

Yet another technique to obtain the required extra information needed to resolve ambiguity involves reducing the degrees of freedom in the system while maintaining the number of beacons used, or alternatively adding beacons. Degrees of freedom are reduced by using external information, notably map data. With map data, for example, one can independently obtain altitude information as a function of x and y position. Using this information, solutions which do not exhibit the proper x, y and z relationships can be discarded. Because of the large wavelength (ten mile) of the preferred waveform, two or more solutions which exhibit the same x, y and z relations are highly unlikely.

A similar approach, herein called the quantized map approach, divides the local region into one or more sections and describes the z axis by using a single number representing the average local altitude for that section. With sufficiently fine quantization, consistent x, y and z solutions are rendered unlikely except for the unique position at which the mobile unit is found.

Yet another technique uses extra information regarding changes in the observed phases as a function of changing system geometry. System geometry is changed either by movement of the mobile unit or by using different beacons, which is tantamount to "beacon movement". User movement allows the system to examine the changes in observed phases as a function of changing position. There may be many solutions consistent with a set of phase observations, but only one will remain consistent in the presence of user movement. After observing user movement for a sufficient period of time, only one solution, the mobile unit's true position, will survive. This is particularly suitable for systems that are mounted on moveable vehicles but which either lack a user interface or in which a user may not be able to specify the system's starting position.

An equivalent approach is to add yet another beacon to take a different constellation of beacons while keeping the number of degrees of freedom the same. If, for example, we wish to solve for x, y, z and time, then a minimum of four beacons are required to solve for all quantities. An infinite number of solutions are available, but this number is rendered finite using the safe assumptions that we are near the surface of the planet and within range of the beacons that the mobile unit receives. This finite number of solutions can be reduced to a single unique answer by using a fifth beacon to resolve which solution is consistent. Plainly, this technique can be extended to use even more beacons. Only one solution will remain consistent, the true mobile unit position.

FIXED POSITION OBSERVER UNIT

Referring to FIGS. 1, 2, 3 and 12, the fixed position observer unit 110 has the same hardware as shown in FIG. 2 for a mobile receiver unit 120, except that the fixed position unit 110 is coupled to a transmitter for the purpose of sending reference data to the mobile units, as shown in FIG. 1. Furthermore, the signal processing software (i.e., the loop filter, phase master accumulator, low pass filter, and phase update routines) for the fixed position unit is basically the same as the mobile unit's software.

Figure 12:
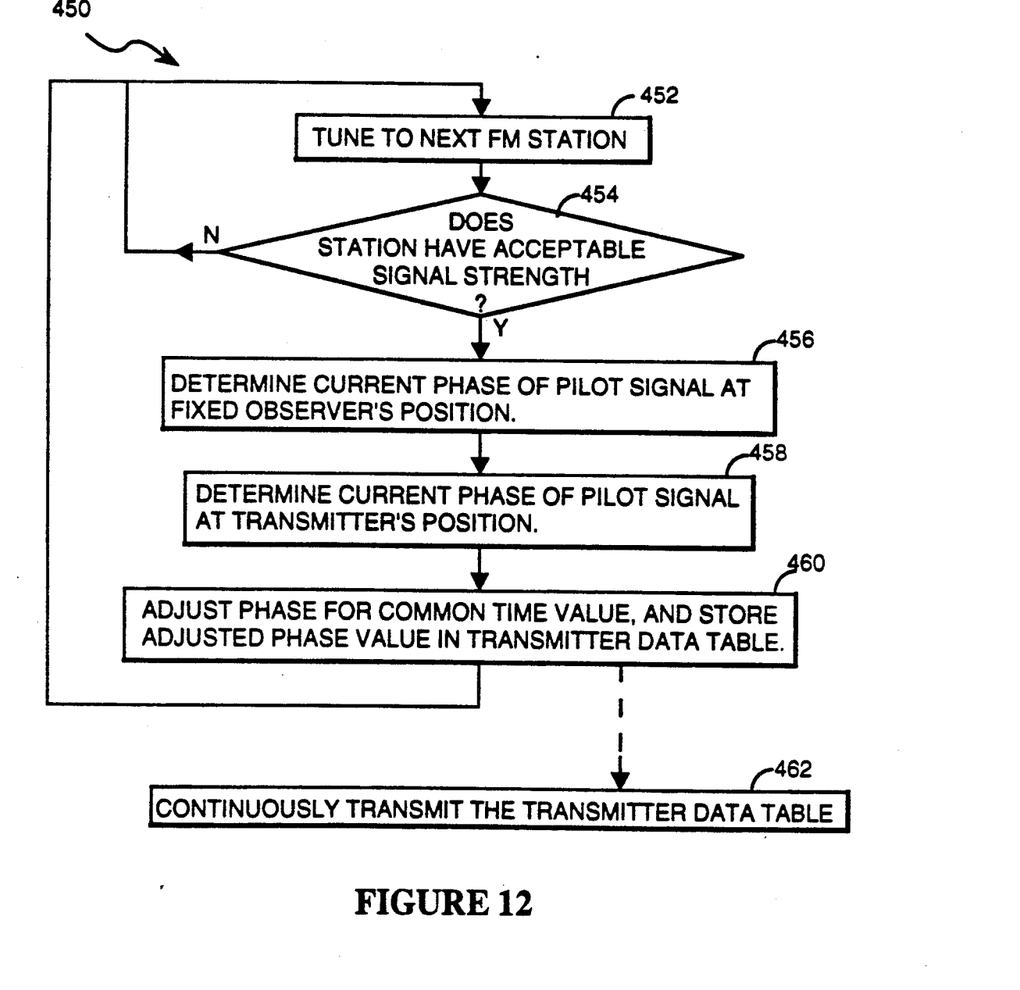
FIG. 12 is a flow chart of the main routine for the fixed observer unit.

The navigation routine 168 of the mobile unit is replaced by a routine for converting the detected phase of each beacon signal into a phase value at the position of the beacon's transmitter antenna at a selected reference time $t_0$. This is simply a matter of computing a phase shift based on the distance between the fixed observer unit 110 and the transmitter antenna, and the difference between the reference time $t_0$ and the time that the phase was measured. The required computation is shown by Equation 20:

$$\phi_n(t) = \Phi_n(t_0) + \frac{2\pi R n}{\lambda} \qquad \text{(Eq. 20)}$$

where $\Phi_n(\ )$ is the phase observed by the fixed observer $\phi_n(\ )$ is the computed phase of the nth beacon signal at its antennae Note that $\lambda$ is the wavelength of the received signal, where $\lambda = c/(19{,}000 + \omega'/2\pi)$ and $\omega'$ is the drift frequency measured by the fixed observer (see FIG. 8).

Referring to FIG. 12, the main control routine for the fixed observer operates as follows. At steps 452 and 454, the fixed observer unit scans all the available FM stations to find those with sufficient signal quality for further processing.

For each station with acceptable signal quality (strength and antenna position), the fixed observer measures the phase of its beacon signal (i.e., its 19 KHz pilot tone) at the fixed observer's position (step 456). Then it computes the phase of that beacon signal at the transmitting antenna's position, at a selected time $t_0$, using Equation 20, above, and stores the adjusted phase value in a beacon data table (steps 458 and 460). The data values currently in the beacon data table are continuously broadcast to the mobile units. It has been observed that the frequencies and phases of the pilot tones of FM stations are very stable, and that updating the reference data for each beacon signal once every few seconds is more than sufficient to maintain an accurate positioning system.

Each mobile unit uses the reference data from the fixed observer to locally regenerate a set of beacon signals with coordinated phases, closely replicating the actual beacon signals at positions of their antennae. Thus the role of the fixed observer is to provide data that enables the mobile units to locally regenerate accurate replicas of the beacon signals. Since the relative phases of the beacon signals are known, the beacon signals are effectively coordinated beacons. The mobile unit mixes each of these regenerated beacon signals with the corresponding received beacon signal, thereby producing a high accuracy phase value for each beacon signal. The navigation routine then computes the mobile unit's absolute position, in the coordinate system of the beacon antennae, based on these phase values.

ALTERNATE EMBODIMENTS

The beacon signals used by the present invention need not be sinusoidal waveforms. For instance, a square wave or pulsed beacon signal could be used, requiring only that the system's phase detector circuit measure the phase of transitions in the received beacon signal. Other beacon signal waveforms could be used, so long as the phase of the received beacon signal can be resolved accurately by both the fixed position observer and the mobile units.

In an alternate embodiment, the fixed observer unit is programmed to transmit not only phase values for each beacon signal, but also a drift frequency value. The drift frequency value is then used by the mobile unit in its computations, in place of the drift frequency measured by the mobile unit, so as to eliminate any Doppler shift in the frequency value caused by movement of the mobile unit.

It is noted that while the preferred embodiment uses transmitters that are at fixed positions, the present invention could be used with mobile or orbiting transmitters, so long as the positions of the transmitters can be precisely determined at any specified point in time.

The present invention could be used with any stable radio station sub-carrier signal, preferably having a frequency between 1 KHz and 100 KHz.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A positioning system for use with a multiplicity of transmitters that are positioned at known fixed locations, wherein each transmitter transmits a beacon signal having a phase that is un-synchronized with the phases of the beacon signals of the other transmitters; each of said beacon signals having a frequency which is approximately equal to a predetermined target frequency; said positioning system comprising:

a first receiver, at a known location relative to the locations of said multiplicity of transmitters, which (A) receives said beacon signals, (B) determines the phases and frequencies of said beacon signals at times determined with reference to a first time reference signal, and (C) broadcasts phase and frequency data representing said beacon signal phases and frequencies; said broadcast phase and frequency data including time data representing when, relative to said first time reference signal, said beacon signals attained said beacon signal phases; and a second receiver, at an unknown location, which receives said broadcast phase and frequency data from said first receiver and at least three of said beacon signals, said second receiver including a local clock generator, un-synchronized with said first time reference signal, that generates a second time reference signal, phase detection circuitry for detecting, at times determined with reference to said second time reference signal, the phases and frequencies of said beacon signals at the location of said second receiver, and computation means for computing, based on said broadcast phase and frequency data and said detected phases and frequencies, coordinate values defining said second receiver's position and a time adjustment value for bringing said second time reference signal into alignment with said first time reference signal, said time adjustment value further relating said detected phases to said broadcast phase data in accordance with a predefined set of simultaneous equations.

2. The positioning system of claim 1, said second receiver including a single, frequency scanning radio signal receiver for sequentially receiving selected beacon signals at a multiplicity of distinct carrier frequencies;

said phase-detection circuitry including a single digital phase-locked loop, coupled to said frequency scanning radio signal receiver, which receives said beacon signal and generates a phase error signal;

said computation means including phase computation means, coupled to said phase-detection circuitry, for integrating said phase error signal while said second receiver is receiving each said selected beacon signal, and generating a distinct phase and frequency value for each said selected beacon signal;

said computation means further including software means for performing a predefined position computation using said generated phase and frequency values and said broadcast phase and frequency data received from said first receiver.

3. The positioning system of claim 1, said second receiver including memory means storing transmitter position data indicating the positions of said multiplicity of transmitters;

said computation means including software means for performing a predefined position computation using said stored transmitter position data to generate a position value for said second receiver which is consistent with said stored transmitter position data.

4. The positioning system of claim 1, wherein said beacon signal transmitted by each of said transmitters comprises an FM radio station sub-carrier signal having a frequency of approximately 19 KHz.

5. The positioning system of claim 1, wherein said beacon signal transmitted by each of said transmitters comprises a sub-carrier signal on a radio station carrier signal, said sub-carrier having a frequency between 1 KHz and 100 KHz.

6. The positioning system of claim 1,
said computation means including
  (A) phase adjustment means for adjusting said detected phases in accordance with said detected frequencies so as to represent said detected phases at a common time relative to said second time reference signal prior to computing said coordinate values and time adjustment value; and
  (B) memory means for storing transmitter position data indicating positions of said transmitters with respect to a predefined coordinate system; and
  (C) means for performing a predefined position computation using said stored transmitter position data to generate a position value in said predefined coordinate system for said second receiver.

7. The positioning system of claim 1, said first receiver including a first clock generator that generates said first time reference signal.

8. A positioning system for use with a multiplicity of transmitters, at known fixed locations, each of which transmits a beacon signal having a phase that is un-synchronized with the phases of the beacon signals of the other transmitters; each of said beacon signals having a frequency which is approximately equal to a predetermined target frequency; said positioning system comprising:

a first receiver, at a known location relative to the locations of said multiplicity of transmitters, which (A) receives said beacon signals, (B) determines the phases and frequencies of said beacon signals at times determined with reference to a first time reference signal, and (C) broadcasts phase and frequency data representing said beacon signal phases and frequencies; said broadcast phase and frequency data including time data representing when, relative to said first time reference signal, said beacon signals attained said beacon signal phases;

a second receiver, at an unknown location, which receives at least three of said beacon signals, said second receiver including:
  a local clock generator, un-synchronized with said first time reference signal, that generates a second time reference signal; and
  phase detection circuitry for detecting, at times determined with reference to said second time reference signal, the phases and frequencies of said received beacon signals at the location of said second receiver; and position computation means which receives said broadcast phase and frequency data from said first receiver and said phases and frequencies detected by said second receiver, said position computing means including means for computing, based on said broadcast phase and frequency data and said detected phases and frequencies, coordinate values defining said second receiver's position and a time adjustment value for bringing said second time reference signal into alignment with said first time reference signal, said time adjustment value further relating said detected phases to said broadcast phase data in accordance with a predefined set of simultaneous equations.

9. The positioning system of claim 8, said first receiver including a first clock generator that generates said first time reference signal.

10. The positioning system of claim 8,
said second receiver receiving at least four of said beacon signals and detecting the phases and frequencies of said at least four beacon signals at the location of said second receiver at times determined with reference to said second time reference signal; and said coordinate values computed by computation means comprising a three-dimensional set of coordinate values defining said second receiver's position with respect to a predefined three-dimensional coordinate system.

* * * * *